US010022861B1

(12) United States Patent
He et al.

(10) Patent No.: US 10,022,861 B1
(45) Date of Patent: Jul. 17, 2018

(54) TWO JOINT MODULE AND ARM USING SAME

(71) Applicant: ENGINEERING SERVICES INC., Toronto (CA)

(72) Inventors: Xiaojia He, Toronto (CA); Ziren Lu, Thornhill (CA); Andrew A. Goldenberg, Toronto (CA)

(73) Assignee: ENGINEERING SERVICES INC., Markham, ON (CA)

( * ) Notice: Subject to any disclaimer, the term of this patent is extended or adjusted under 35 U.S.C. 154(b) by 0 days.

(21) Appl. No.: 15/499,604

(22) Filed: Apr. 27, 2017

(51) Int. Cl.
*B25J 9/00* (2006.01)
*B25J 9/12* (2006.01)
*B25J 18/04* (2006.01)

(52) U.S. Cl.
CPC ............. *B25J 9/126* (2013.01); *B25J 18/04* (2013.01)

(58) Field of Classification Search
CPC .................................. B25J 9/126; B25J 18/04
USPC ................ 74/490.01–490.06; 901/23, 24, 28
See application file for complete search history.

(56) References Cited

U.S. PATENT DOCUMENTS

| D56,926 S | 1/1921 | Humphrey | |
|---|---|---|---|
| 4,402,234 A * | 9/1983 | Malarz | B25J 19/0029 901/29 |
| 4,691,419 A * | 9/1987 | Keeler | H05K 13/0473 901/30 |
| 4,873,476 A * | 10/1989 | Kurakake | G05B 19/237 901/9 |
| 5,101,681 A | 4/1992 | Shpigel | |
| 5,293,107 A * | 3/1994 | Akeel | B25J 9/08 901/25 |
| D370,964 S | 6/1996 | Horvath et al. | |
| 5,673,595 A | 10/1997 | Hui et al. | |
| 5,712,552 A | 1/1998 | Hirai et al. | |
| 6,084,373 A | 7/2000 | Goldenberg et al. | |
| 6,394,998 B1 | 5/2002 | Wallace et al. | |
| D634,818 S | 3/2011 | Leroyer | |
| D638,044 S | 5/2011 | Ikoma et al. | |

(Continued)

FOREIGN PATENT DOCUMENTS

| CN | 1876335 | 12/2006 |
|---|---|---|
| CN | 101579860 | 11/2009 |

(Continued)

OTHER PUBLICATIONS

E. T. Baumgartner, R. G. Bonitz, J. P. Melko, L. R. Shiraishi and P. C. Leger, "The Mars Exploration Rover Instrument Positioning System," Proceedings of the 2005 IEEE Aerospace Conference, Big Sky, MT, Mar. 2005.

(Continued)

*Primary Examiner* — Victor L MacArthur

(57) ABSTRACT

A two joint module includes a housing and a pair of hollow rotary actuator assemblies. Each actuator assembly has an axis and a hollow shaft and the axes are arranged at an angle to each other. The pair of hollow rotary actuator assemblies are arranged back to back and attached to the housing such that cables can be fed from the outside of one of the pair of hollow rotary actuator assemblies to the inside thereof and to the inside of the other of the pair of hollow rotary actuator assemblies to the outside thereof. The disclosure also relates to a robotic arm. The robotic includes at least two two joint modules as described herein and at least a first link.

10 Claims, 14 Drawing Sheets

(56) References Cited

U.S. PATENT DOCUMENTS

| | | | |
|---|---|---|---|
| D670,319 S | 11/2012 | Liu et al. | |
| D676,941 S | 2/2013 | Kluss et al. | |
| D677,294 S | 3/2013 | Long | |
| 8,525,460 B2 | 9/2013 | Reiland et al. | |
| D692,041 S | 10/2013 | Selic et al. | |
| D709,933 S | 7/2014 | Wu | |
| D716,357 S | 10/2014 | Gombert | |
| 8,910,538 B2 | 12/2014 | Hayashi et al. | |
| D740,371 S | 10/2015 | Ries | |
| 9,375,841 B1 | 6/2016 | Kemper | |
| D766,348 S | 9/2016 | Long | |
| 9,481,096 B2 | 11/2016 | Goldenberg et al. | |
| D776,178 S | 1/2017 | Ries | |
| D781,943 S | 3/2017 | Ries | |
| D790,618 S | 6/2017 | Ke et al. | |
| 2002/0056326 A1 | 5/2002 | Gombert et al. | |
| 2004/0193318 A1 | 9/2004 | Ito | |
| 2007/0208458 A1 | 9/2007 | Harada et al. | |
| 2010/0192720 A1 | 8/2010 | Helmer et al. | |
| 2010/0242660 A1 | 9/2010 | Offer et al. | |
| 2011/0064554 A1 | 3/2011 | Ito et al. | |
| 2011/0107866 A1 | 5/2011 | Oka et al. | |
| 2011/0232411 A1 | 9/2011 | Long | |
| 2011/0265597 A1 | 11/2011 | Long | |
| 2011/0296944 A1 | 12/2011 | Carter et al. | |
| 2011/0298343 A1 | 12/2011 | Kim et al. | |
| 2012/0048051 A1 | 3/2012 | Long | |
| 2012/0067148 A1 | 3/2012 | Long | |
| 2012/0085191 A1 | 4/2012 | Long | |
| 2012/0192671 A1 | 8/2012 | Riwan et al. | |
| 2012/0204670 A1 | 8/2012 | Ryland et al. | |
| 2013/0068060 A1 | 3/2013 | Xu et al. | |
| 2013/0118286 A1 | 5/2013 | Long | |
| 2013/0125694 A1 | 5/2013 | Long | |
| 2013/0125696 A1 | 5/2013 | Long | |
| 2013/0145891 A1 | 6/2013 | Long | |
| 2014/0026705 A1 | 1/2014 | Sasaki et al. | |
| 2014/0060233 A1 | 3/2014 | Gomi et al. | |
| 2014/0102239 A1 | 4/2014 | Umeno | |
| 2014/0116182 A1 | 5/2014 | Long | |
| 2014/0137687 A1 | 5/2014 | Nogami et al. | |
| 2014/0224057 A1 | 8/2014 | Tanaka et al. | |
| 2014/0338490 A1 | 11/2014 | Shinabe | |
| 2015/0251322 A1 | 9/2015 | Goodwin et al. | |
| 2015/0290817 A1* | 10/2015 | Goldenberg | B25J 17/00 74/490.02 |
| 2016/0061367 A1 | 3/2016 | Smith et al. | |
| 2016/0101518 A1 | 4/2016 | Saito et al. | |
| 2016/0331482 A1 | 11/2016 | Hares | |
| 2017/0020615 A1 | 1/2017 | Koenig et al. | |

FOREIGN PATENT DOCUMENTS

| | | |
|---|---|---|
| CN | 102862165 | 1/2013 |
| JP | 2001260700 | 9/2001 |
| KR | 100882920 | 2/2009 |
| WO | 2008136405 | 11/2008 |

OTHER PUBLICATIONS

P. Schenker et al. "Dexterous Robotic Sampling for Mars in-situ Science" Publication date Oct. 14, 1999 conference paper International Society for Optical Engineering (SPIE); Pittsburgh, PA, United States.

Schunk, Servo-electric rotary pan-tilt actuator Type PW 70-90 Assembly and operating manual, Trans., 02.01 ed., Lauffen/Neckar, Schunk GmbH & Co. KG, Aug. 14, 2012. Print.

* cited by examiner

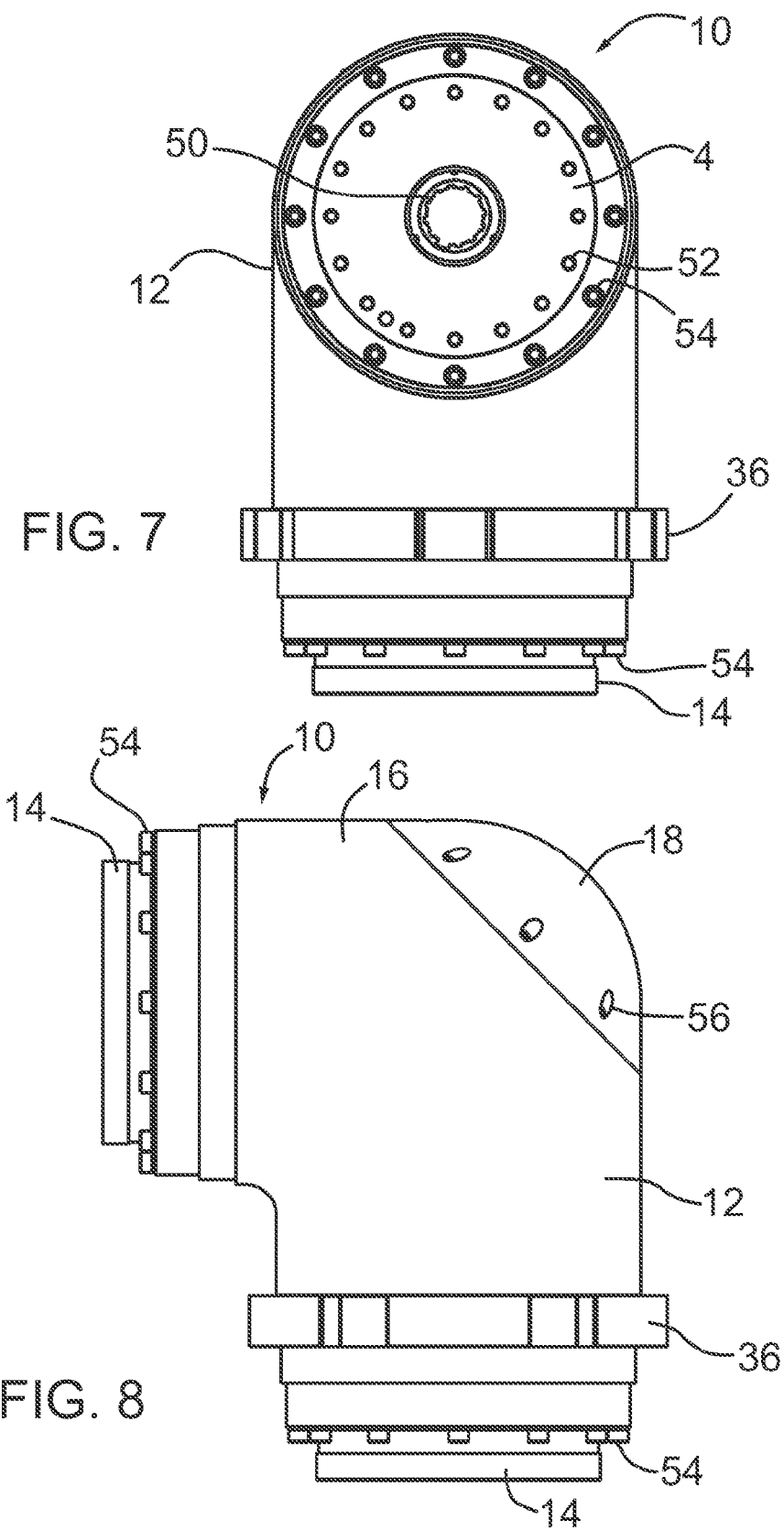

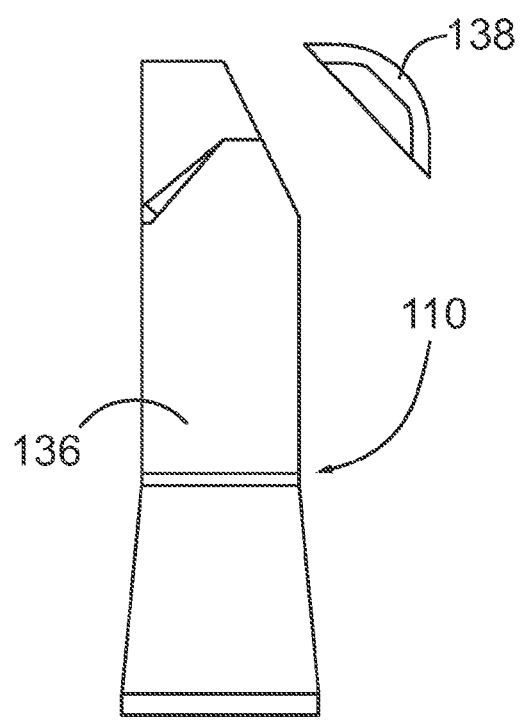
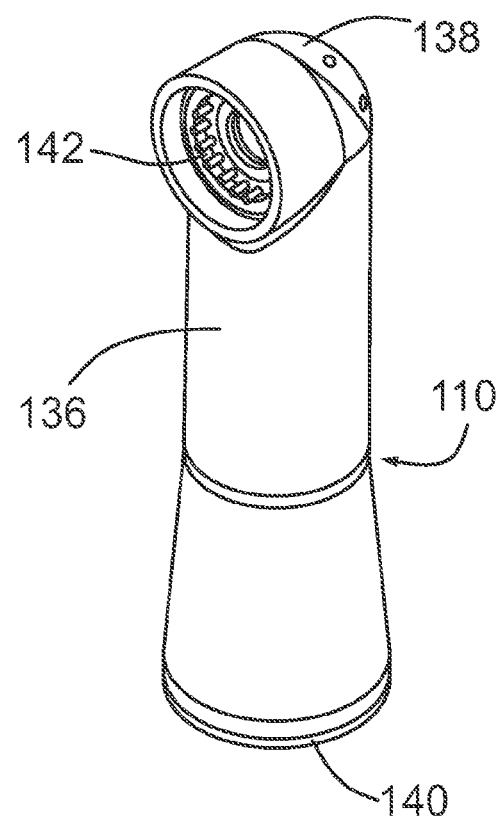
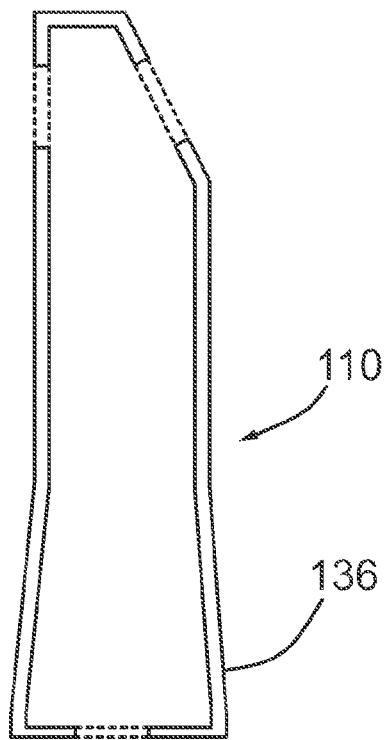
FIG. 16     FIG. 17
FIG. 18

TWO JOINT MODULE AND ARM USING SAME

FIELD OF THE DISCLOSURE

This disclosure relates to robotic joints and robotic arms using the joints and in particular a two joint module having two degrees of freedom and having a generally L-shape and robotic arms using same.

BACKGROUND

Two degree-of-freedom (2-DOF) joint modules used in robotic arms are becoming more common due to several advantages such as: compact size, light weight and lower cost. Joint modules are designed to meet certain requirements and constraints and these are transformed into the design specifications. For industrial applications, the requirements of payload range, speed, accuracy, reliability, lifetime, safety, ease of assembly and maintenance are very important.

There is a type of 2-DOF joint module, called Powerball ERB™, designed by Schunk GmbH & Co. KG. This joint module is housed in a ball shape enclosure that contains all the components needed to control the joint: servo motor, encoder, motor drive, harmonic drive, holding brake and hollow shaft for internal cabling. The joint module is not sealed as ventilation is needed to dissipate heat generated by the electronic components such as motor, motor drive and brake. The module is light weight, compact and is highly integrated. However, this design has limitations.

First, the Powerball ERB™ joint module consists of many mechanical and electronic components and this increases the complexity of the structure while also creates a heat dissipation problem. Since all electrical and control components are integrated in the module housing, the heat generated by these components requires a relatively large space to dissipate. However, since this joint is designed to be a compact joint, the power consumed by the electronic components is constrained by the heat that is generated. This in turn limits the output power of the joint module. Hence, the application of this type of joint module in terms of payload range is limited.

Second, to solve the issue of heat dissipation, openings or slots are made on the housing. This limits the applications of the joint module under certain harsh industrial environments such as dusty, humid, and explosive environments. These joints could not be used in robot arms for painting, coating and welding. For example, the explosive gases and sparks that may be present in such industrial applications could get into the joint module and cause explosions.

Third, the Powerball ERB™ can be used to build a robotic arm, LWA-4P™. The LWA-4P arm comprises three Powerball joint modules and two links. Since the joint modules have limitations on heat dissipation and power capped issues, the arm cannot work under some harsh industrial environments and the payload of the arm is limited.

There is another 2-DOF joint module, designed by Engineering Services Inc. (ESI) with U.S. Pat. No. 9,044,865. This joint module is designed for large torque and low speed applications. The joint module includes a module housing and two joints. Also, one of joints has a hollow shaft gearhead, an off-axis drive, a servo motor, and internal cables extending through the hollow shaft gearhead. Since the joint module is designed to connect with a link, it has an active side and a passive side with electronic connectors. The active side is mechanically connected to the link and the electronic connectors of the passive side are operably connected to the link cables. The joint is used to build a robotic arm. There are limitations with this design as discussed below.

First, since all the components needed to control the motion of the joint are integrated into the module, it has the same heat dissipation problem mentioned in the Powerball EBR™.

Second, the cable routing inside the module is complicated because of the internal structure of the joint module. One of joints uses a non-hollow shafted motor and gearhead for providing the torque. Because of the internal structure of the joint, the cables go into one end of the module and inside the module turn 90 degrees and go out the other side of the module. In this case, the cables will be squeezed inside the housing. This may cause large torsional forces on the cables.

There is another type of 2-DOF joint module, designed by Fanuc Robotics North America as shown in U.S. Pat. No. 5,293,107. Each module housing accommodates two hollow shafted rotary actuators, other electronic components and internal cables. The joint is used to build a robotic arm. However, this design also has limitations.

First, the installation process of rotary actuators and electronic components is complicated because it requires too many assembly steps. The two actuator sets are installed inside the housing, with their output shaft facing outside and the motor facing inside of the housing. The two actuators will be fixed to the housing wall by bolts and screws. To mount the two actuators in the housing, the two actuators cannot be put in from outside to inside of the housing. Instead, the actuators must be installed from the inside. So, the entire housing must be dissembled. Once the actuators are installed the housing is reassembled as one piece with screws and bolts. Therefore, the installation process is complicated.

Second, the joint module housing of Fanuc is not made of one piece. The housing box is made of several pieces and these pieces are fixed by screws and bolts to form the housing. So, the structure of the housing is not as strong as the one-piece housing.

Third, the maintenance process of the joint module is complicated. To access the actuators and other electronic components, a user needs to dissemble the housing case, conduct the maintenance, and resemble the housing once the maintenance is finished.

All of the aforementioned approaches to modular joints have limitations for industrial applications. It would be advantageous to design a new type of 2-DOF joint module which will have features such as compact, low heat generation, sealed and rigid housing, large payloads, ease of installation and maintenance process and assembly.

SUMMARY

The present disclosure relates to a two joint module. The two joint module includes a housing and a pair of hollow rotary actuator assemblies. Each actuator assembly has an axis and a hollow shaft and the axes are arranged at an angle to each other. The pair of hollow rotary actuator assemblies are arranged back to back and attached to the housing such that cables can be fed from the outside of one of the pair of hollow rotary actuator assemblies to the inside thereof and to the inside of the other of the pair of hollow rotary actuator assemblies to the outside thereof.

The axes of the pair of hollow rotary actuator assemblies may be arranged orthogonally.

Each hollow rotary actuator assembly may include a brushless DC servo motor having a hollow central portion, an encoder having a hollow central portion, a brake having a hollow central portion and an encoder having a hollow central portion. Each hollow rotary actuator assembly may be a combo actuator.

The housing may include a housing body and a housing cover releasably attachable to the housing body. The housing body may include a pair of generally cylindrical compartments for housing the pair of hollow rotary actuator assemblies. The housing body may further include a center compartment between the two generally cylindrical compartments.

The axes of the pair of hollow rotary actuator assemblies may be arranged at an obtuse angle therebetween.

The power, speed and torque of the pair of the hollow rotary actuator assemblies may be the same. Alternatively, the power, speed and torque of the pair of the hollow rotary actuator assemblies may be different.

The two joint module may include a pair of motor drives operably attached to the pair of hollow rotary actuator assemblies and the motor drives are outside the housing.

The disclosure also relates to a robotic arm. The robotic includes at least two two joint modules wherein each two joint module is as described above and at least a first link.

The robotic arm may include a third two joint module and a second link, wherein the two joint modules are a shoulder module, an elbow module and a wrist module. The shoulder module and the elbow module are operably attached to opposing ends of the first link and the elbow module and the wrist module are attached to opposing ends of the second link.

The first link may be a shoulder link. The shoulder link may include a body and a hollow cover and having a first port and a second port. The first port and the second port of the shoulder link are generally in the same plane.

The second link may be a wrist link. The wrist link may have a first and second port that are generally orthogonal to each other.

The robotic arm may include a motor drive operably attached to each of the hollow rotary actuator assemblies and the motor drives being outside the housing.

Further features will be described or will become apparent in the course of the following detailed description.

BRIEF DESCRIPTION OF THE DRAWINGS

The embodiments will now be described by way of example only, with reference to the accompanying drawings, in which:

FIG. 7 is a front view of the two degree of freedom L-shaped two joint module of FIG. 1;

FIG. 8 is a side view of the two degree of freedom L-shaped two joint module of FIGS. 1 and 7;

FIG. 16 is an exploded side view of the elbow link shown in the arm of FIGS. 12 and 13 as viewed from one side thereof;

FIG. 17 is a perspective view of the elbow link of FIG. 16;

FIG. 18 is a cross section view of the elbow link shown in FIGS. 16 and 17;

DETAILED DESCRIPTION

Figure 1:
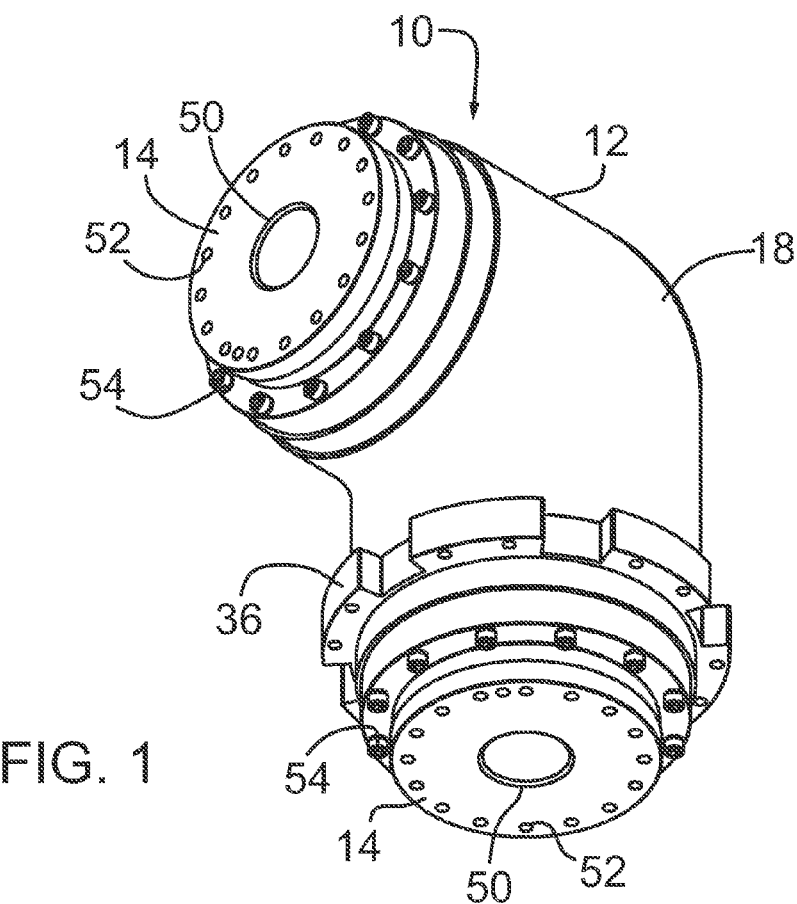
FIG. 1 is a perspective view of a two degree of freedom two joint module which is generally L-shaped.

Referring to FIG. 1, a two degree of freedom two-joint module which is generally L-shaped is shown generally at 10. L-shaped two joint module 10 includes a housing 12, a pair of hollow rotary actuator assemblies 14 arranged orthogonally in the housing 12.

Figure 2:
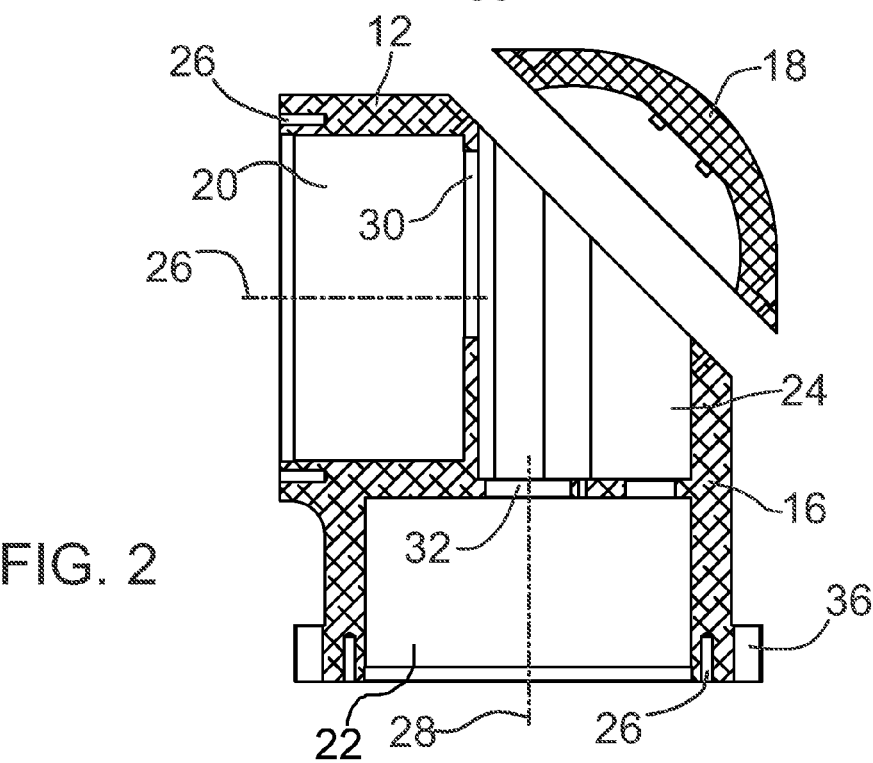
FIG. 2 is a cross sectional view of the housing for the two degree of freedom L-shaped two joint module of FIG. 1.
Figure 3:
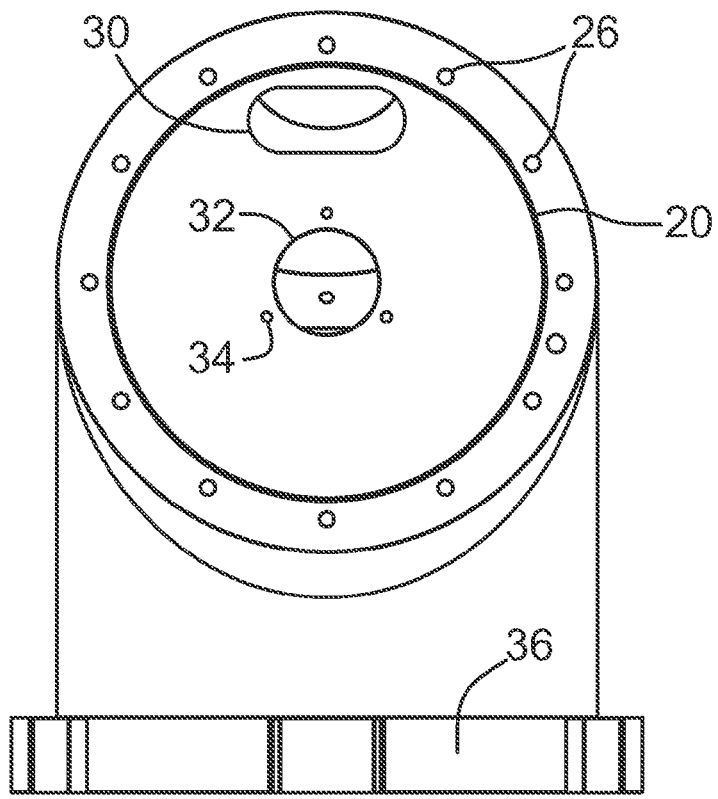
FIG. 3 is a front view of the two degree of freedom L-shaped two joint module housing of FIG. 2.

As best seen in FIGS. 2 and 3 the housing 12 is composed of two parts: a housing body 16 and a housing corner cover 18 that is releasably attachable to the housing body. The housing body 16 contains three compartments: two generally cylindrical compartments 20 and 22 for accommodating the pair of hollow rotary actuator assemblies 14 which may be turret and shoulder actuators; a center compartment 24 is located in between compartments 20 and 22 and is for accommodating the electronics components. Compartments 20 and 22 each have a center axis 26 and 28 respectively. Center axes 26 and 28 are orthogonal to each other. The corner cover 18 is detachable from the housing body 16. The housing body 16 includes a flange 36.

Figure 4:
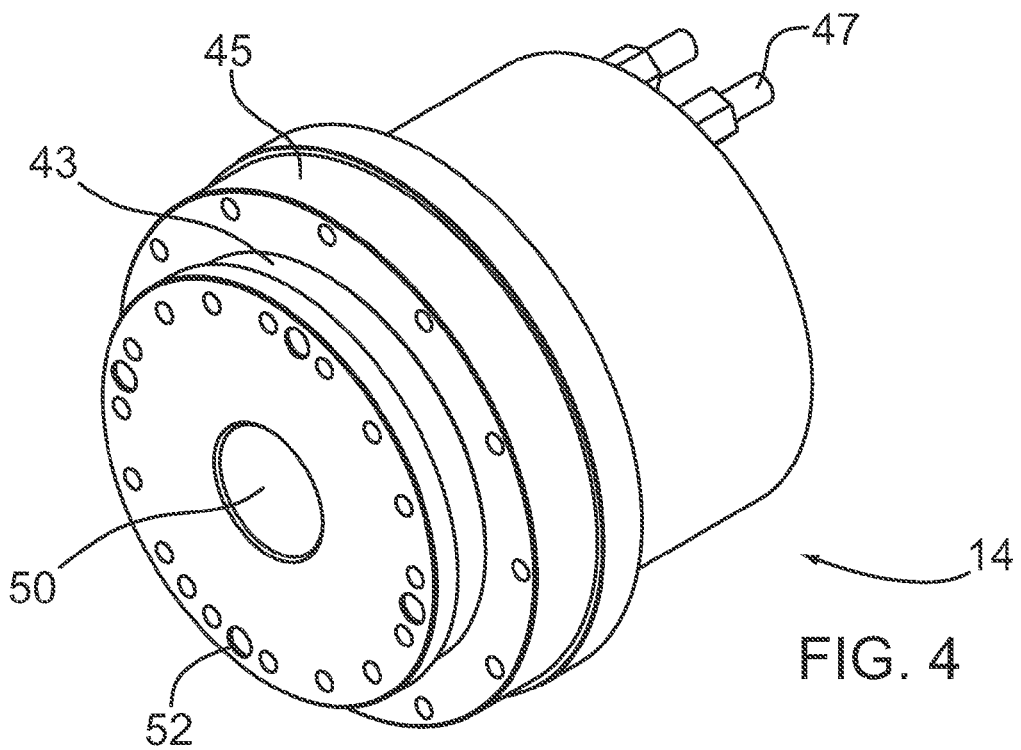
FIG. 4 is a perspective view of an embodiment of a hollow rotary actuator assembly having a central axial hole therethrough and for use with the two degree of freedom L-shaped two joint module of FIG. 1.
Figure 5:
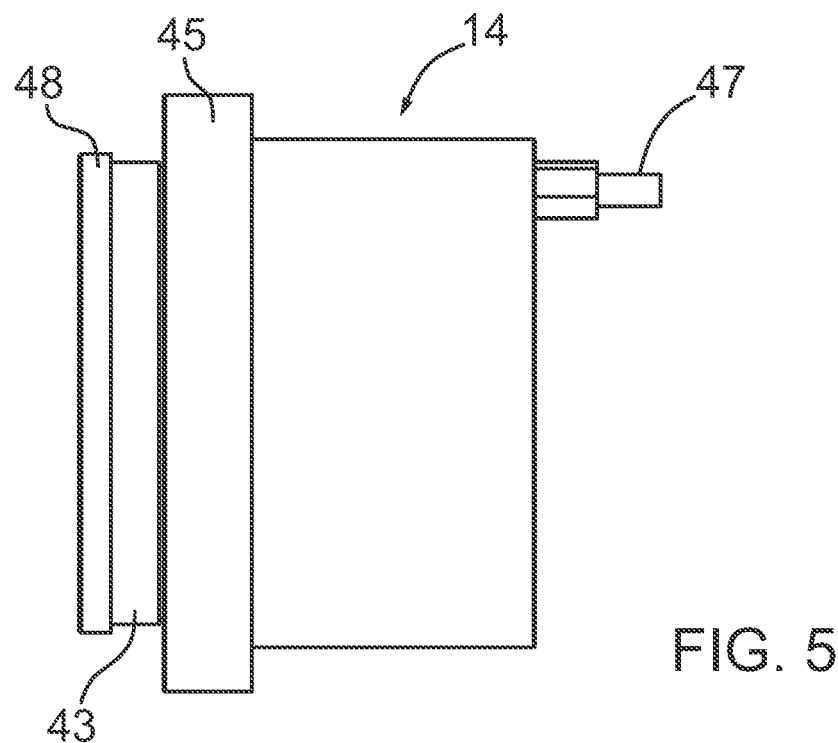
FIG. 5 is a side view of the hollow rotary actuator assembly of FIG. 4.
Figure 6:
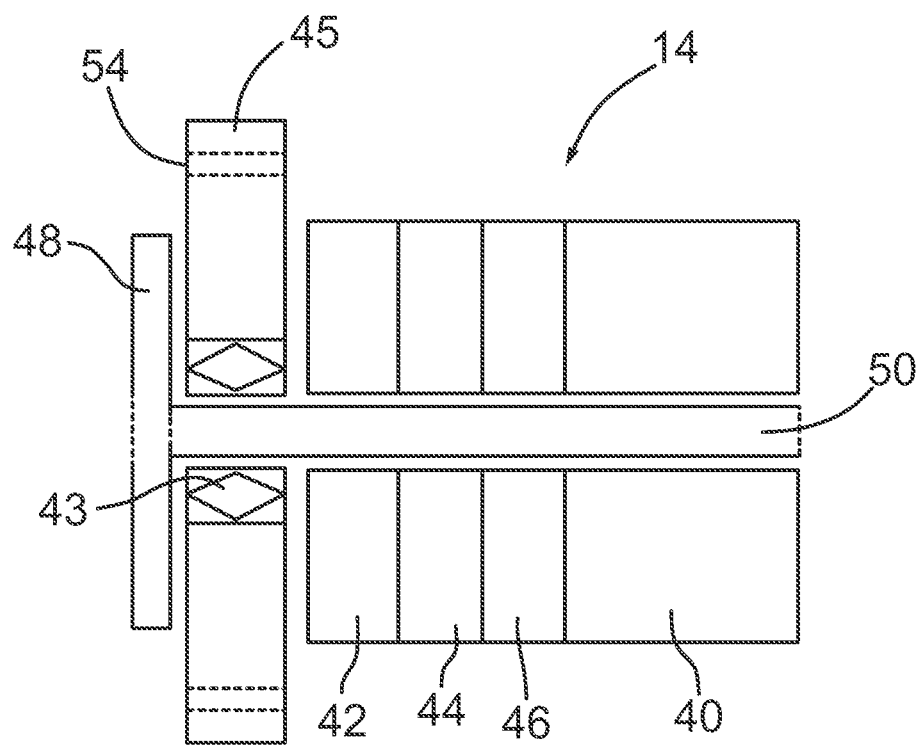
FIG. 6 is a sectional view of the hollow rotary actuator assembly of FIGS. 4 and 5.
Figure 9:
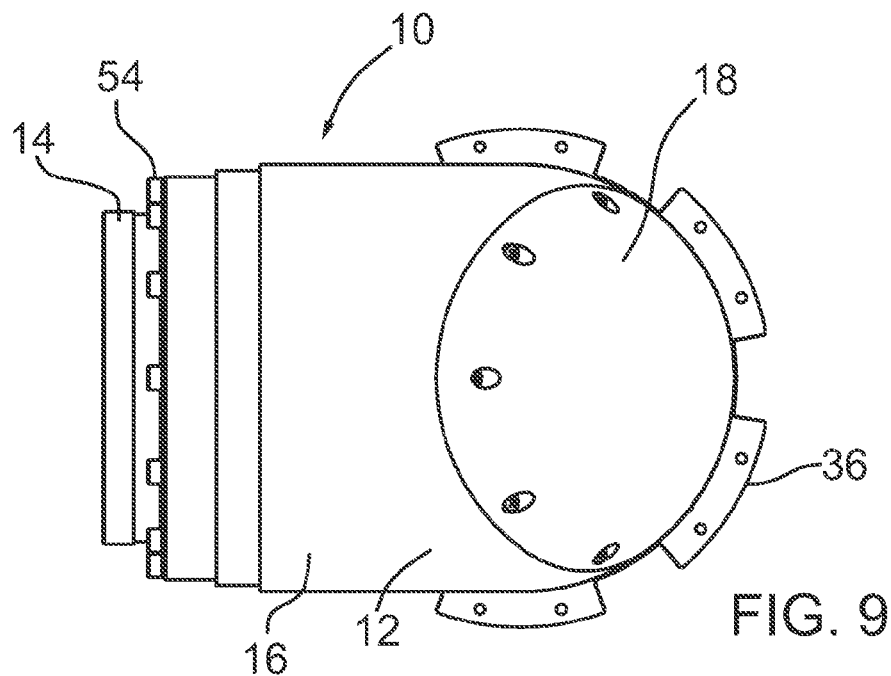
FIG. 9 is a top view of the two degree of freedom L-shaped two joint module of FIGS. 1, 7 and 8.

FIG. 3 shows the front view of the L-shaped two joint module joint module housing 12. The housing body 16 allows two hollow rotary actuator assemblies 14 to have orthogonal axes by means of compartments 20 and 22. A plurality of holes or apertures 26 are formed in the housing body 16 around the opening to the compartments 20 and 22 to allow the hollow rotary actuator assemblies to be mounted therein with screws. Cavity or compartment 20 has a hole 30 on the inside thereof for electronics connection to the hollow rotary actuator assembly 14 (not shown). Similarly cavity or compartment 22 has a hole 32 on the inside thereof for electronics connection to the hollow rotary actuator assembly 14 (not shown). An example of a hollow rotary actuator assembly for use in the L-shaped two joint module 10 is shown in FIGS. 4 to 6. Hollow rotary actuator assembly 14 has a hollow shaft along its central axis. Hollow rotary actuator assembly 14 includes a brushless DC servo motor 40, an encoder 42, a brake 44 and a gear head 46. The hollow rotary actuator assembly 14 has an output shaft 48 for attaching it to the housing 12. Each of the elements of the hollow rotary actuator assembly 14 is generally donut shaped such that the hollow rotary actuator assembly has a hollow central shaft. More specifically the servo motor 40 has a hollow central portion. The encoder 42 is an absolute encoder and has a hollow central portion. The brake 44 has a hollow central portion. The gear head 46 has a hollow central portion. Preferably the hollow rotary actuator assembly 14 is a combo actuator and each element is connected together to form a single combo actuator. Each element is operably connected to cables 47. The combo actuator or hollow rotary actuator assembly 14 has the advantages of compact size, and the hollow shaft feature allows cables to be passed therethrough. The cross-roll bearing 43 is embedded in the flange 45 as best shown in FIG. 6. The cross-roll bearing 43 is used on the mounting flange 45 to simplify the assembly of the combo actuator 14, and reduces its weight and size.

Referring to FIGS. 1, and 7 to 11, a two-joint L-shaped module is shown generally at 10. Module 10 includes two hollow rotary actuator assemblies 14 and a joint housing 12 having a housing body 16 and a housing corner cover 18. The joint housing 12 is shown in FIGS. 2 and 3. The combo actuator 14 has a hollow shaft 50. The axes of the hollow shafts of the two combo actuators 14 are collinear with the center axes 26 and 28 of compartments 20 and 22 of the housing 12, shown in FIG. 2. A plurality of screw holes 52 are formed in the output shaft 48 of the combo actuator 14. The screws holes 54 are formed in the flange plate. The cross-roll bearings 43 form part of the flange plate 45 and the screw holes 54 only go through the flange plate 45. The cross-roller bearing 43 provides support to the output shaft 48 in bending. The output shaft 48 provides the output torque.

Holes 52 are used for connecting the joint module 10 to a robot arm link 102 as described below in relation to FIGS. 12 and 13. A plurality of screws 54 are used to mount the combo actuator 14 to the housing 12. Circular flange 36 may function as a part of a robotic arm mechanical hard stop described in more detail below. A plurality of screws holes 56 are the screw holes for fixing the cover 18 to the joint housing body 16. The combo actuator 14 has an output side defined by the output shaft 48 and an inside 49.

Figure 10:
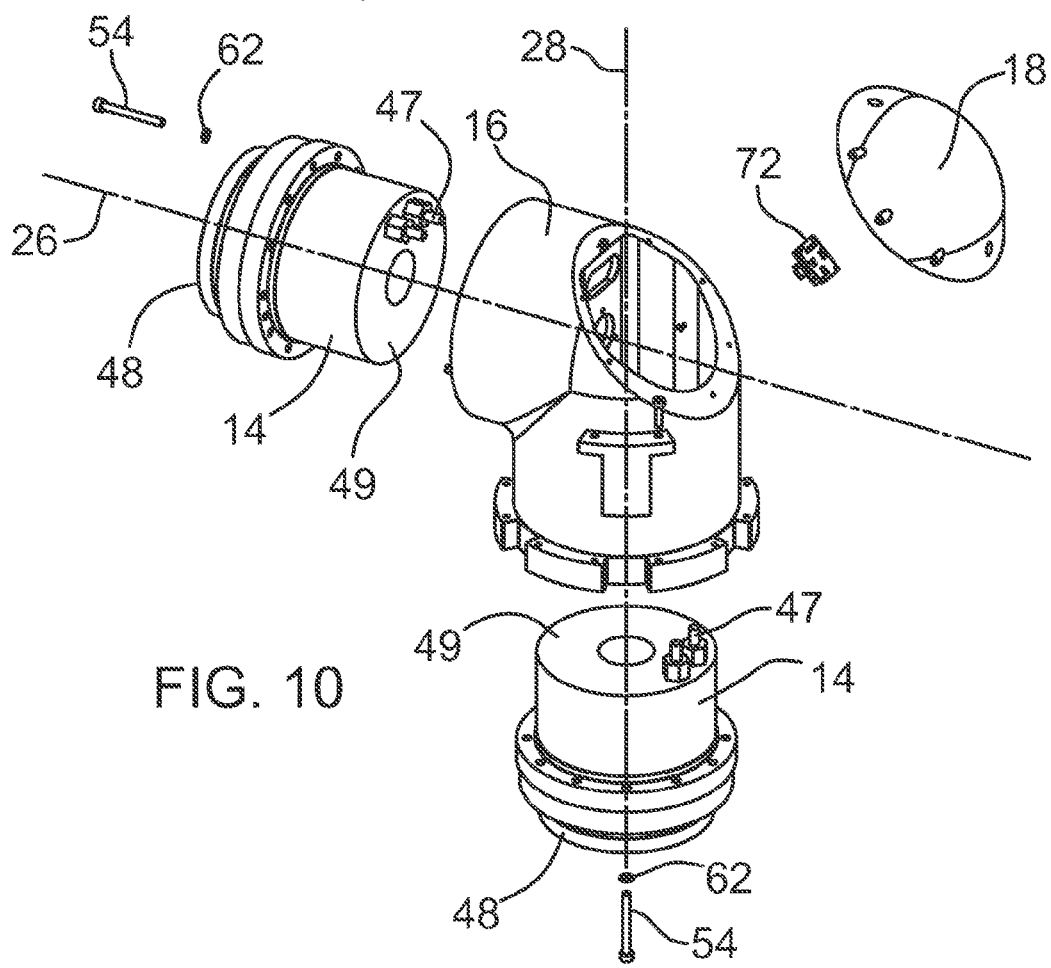
FIG. 10 is an exploded perspective view of the two degree of freedom L-shaped two joint module of FIGS. 1, 7, 8 and 9.
Figure 11:
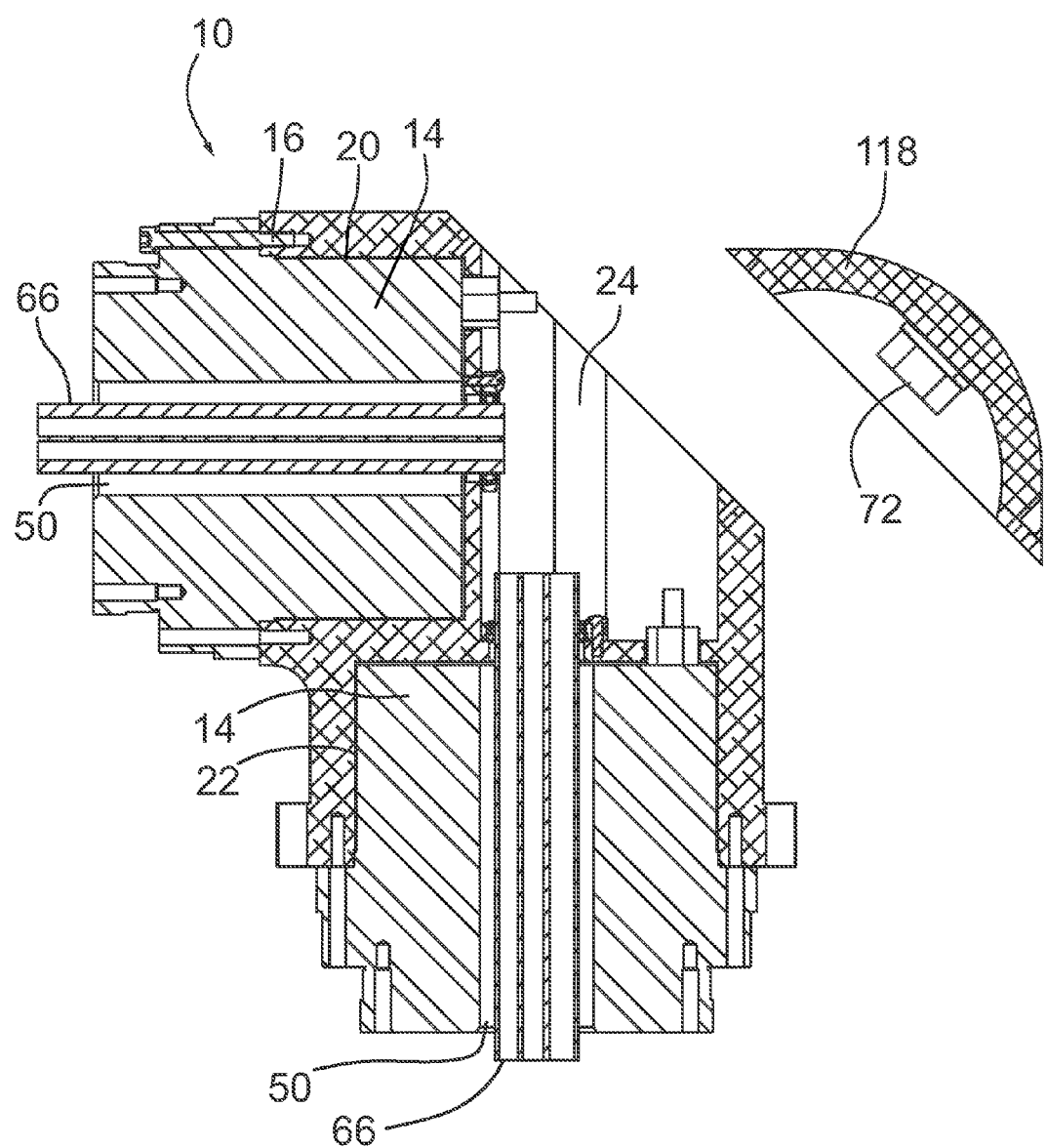
FIG. 11 is a cross sectional view of the two degree of freedom L-shaped two joint module of FIGS. 1, and 7 to 10 and showing the cable routing.

FIG. 10 presents the exploded view of a 2 DOF L-shaped two joint module 10. Module 10 includes two rotary actuators, preferably combo actuators 14, a module housing 12 including a housing body 16 and a housing cover 18. The axes 26 and 28 of the compartments 20 and 22 are co-linear with the axes of the two combo actuators 14. The axes 26 and 28 are orthogonal to each other. The two combo actuators 14 are made of a combo actuator which is shown in FIGS. 4 to 6. The two combo actuators 14 are installed to the housing 12 by being inserted from outside to inside of the housing compartments 20 and 22 (as best seen in FIG. 10). Then, the combo actuators 14 are fixed to the housing 12 with the screws 54. A washer 62 is positioned between of the screw 54 and combo actuator 14. Internal cable holders may be used to stabilize the cables 66 (shown in FIG. 11). Cable bundles 66 are passed through the housing 12 from one end to the other. More specifically the cables go from the outside side defined by the output shaft 48 of one combo actuator 14 to the inside thereof 49 through the central compartment 24 to the inside 49 of the other combo actuator 14 to the outside thereof defined by the output shaft 48. The cable bundles 66 may be held in place with cable holders attached to the inside of the module housing body 16. An electronic component 72 may be mounted on the inside of the cover 18. If present the electronic component 72 is used to distribute signals such as the voltage divider. Alternatively this may be done wirelessly. The cables 47 of the combo actuator 14 are operably connected to cable 66. Similarly the electronic component 72 is operably connected to the cable 66. FIG. 11 shows cable routing through the joint module 10. The cable routing process is simplified with the structure design of the joint module. A bundle of cables 66 is designed to pass the joint module 10 from one end to another end. The sequence is as follow: The cable bundle 66 passes through a combo actuator 14, located in housing compartment 22, through the combo actuator's hollow shaft 50 from one end to another. Then, the cable bundle reaches the compartment 24. After that, the cable bundle 66 passes through the other combo actuator 14, located in housing compartment 20, through the combo actuator's hollow shaft 50 from one end to another.

In addition, as shown in FIG. 11, the maintenance process of the joint module 10 is very easy. For cable connection and electrical parts maintenance, users can simply open the housing cover 18 to access the electronic components placed in the housing compartment 24. For mechanical parts maintenance, users can take the combo actuators 14 out from housing compartment 20 and 22.

Figure 12:
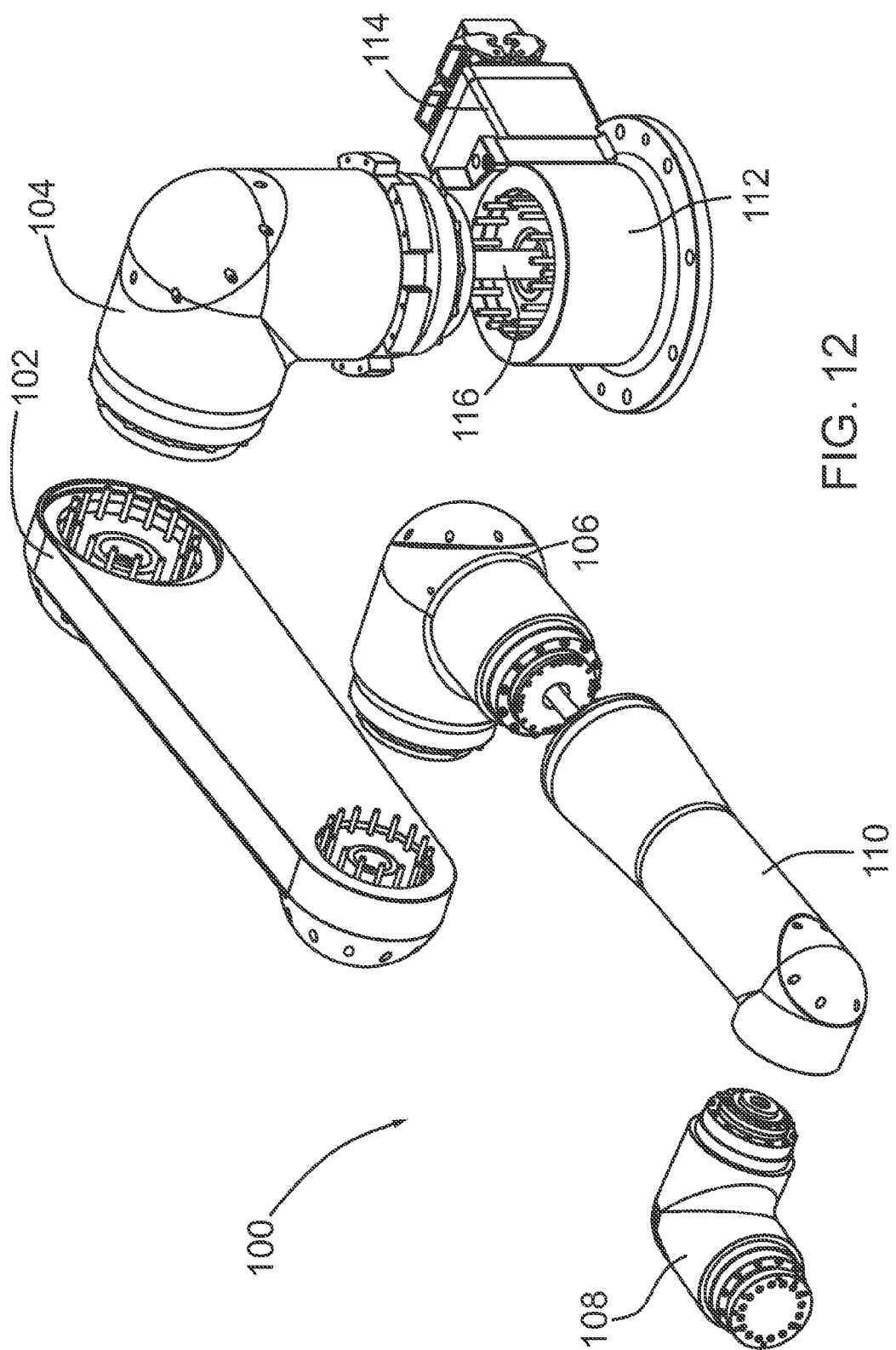
FIG. 12 is an exploded perspective view of an embodiment of an arm using the two degree of freedom L-shaped two joint module of FIGS. 1 and 7 to 11.
Figure 13:
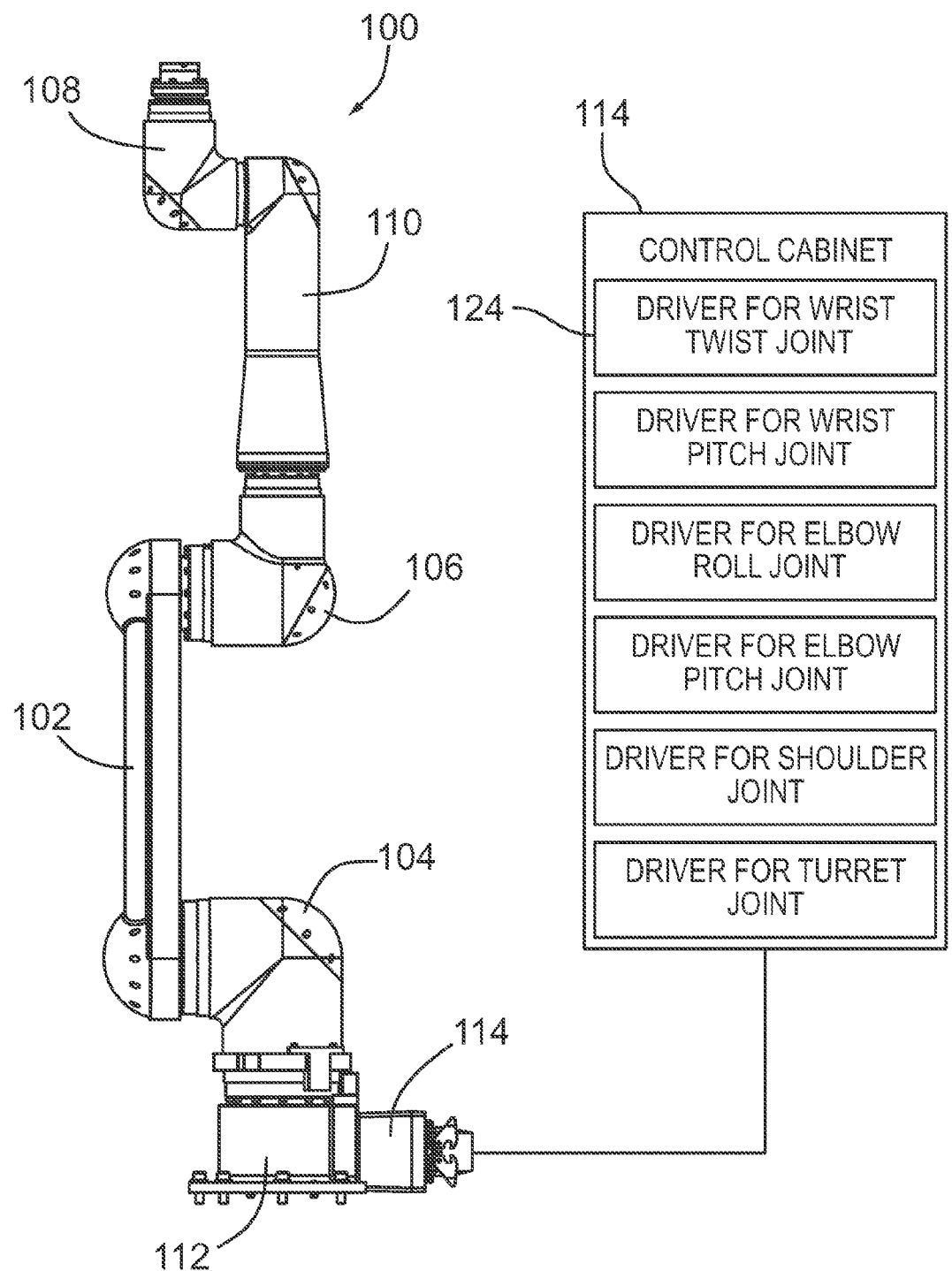
FIG. 13 is a side view of the arm of FIG. 17 shown in a different orientation.

As shown in FIGS. 12 and 13, a robotic arm 100 uses a plurality of the 2 DOF joint modules 10. The joint modules 10 may be used as a turret-shoulder 104, elbow 106, and wrist 108 modules respectively. These modules can be used with two links 102 and 110 respectively to form a six degree of freedom robotic arm 100. The turret shoulder module 104 of the arm 100 is attached to a seat 112. An electronic box 114 is attached to the seat 112. The electronic box 114 or control cabinet includes a plurality of drives 124 (shown in FIG. 13) one for each of the hollow rotary actuator assemblies 14. Each hollow rotary actuator assembly 14 is operably attached to a motor drive 124. The turret-shoulder module 104 is attached to shoulder link 102 at one end thereof. One side of the elbow module 106 is attached to the other end of shoulder link 102. The other side of the elbow-wrist module 106 is attached to one side of an elbow link 110. The other side of the elbow link 110 is attached to wrist module 108.

An internal cable bundle 66 goes in to the arm 100 and is electronically connected to the electronic box 114. The cable bundle 116 passes through the following components: the turret seat 112, the turret-shoulder module 104, the shoulder link 102, the elbow-wrist module 106, the elbow link 110 and the wrist module 108 as shown in FIG. 12.

Figure 14:
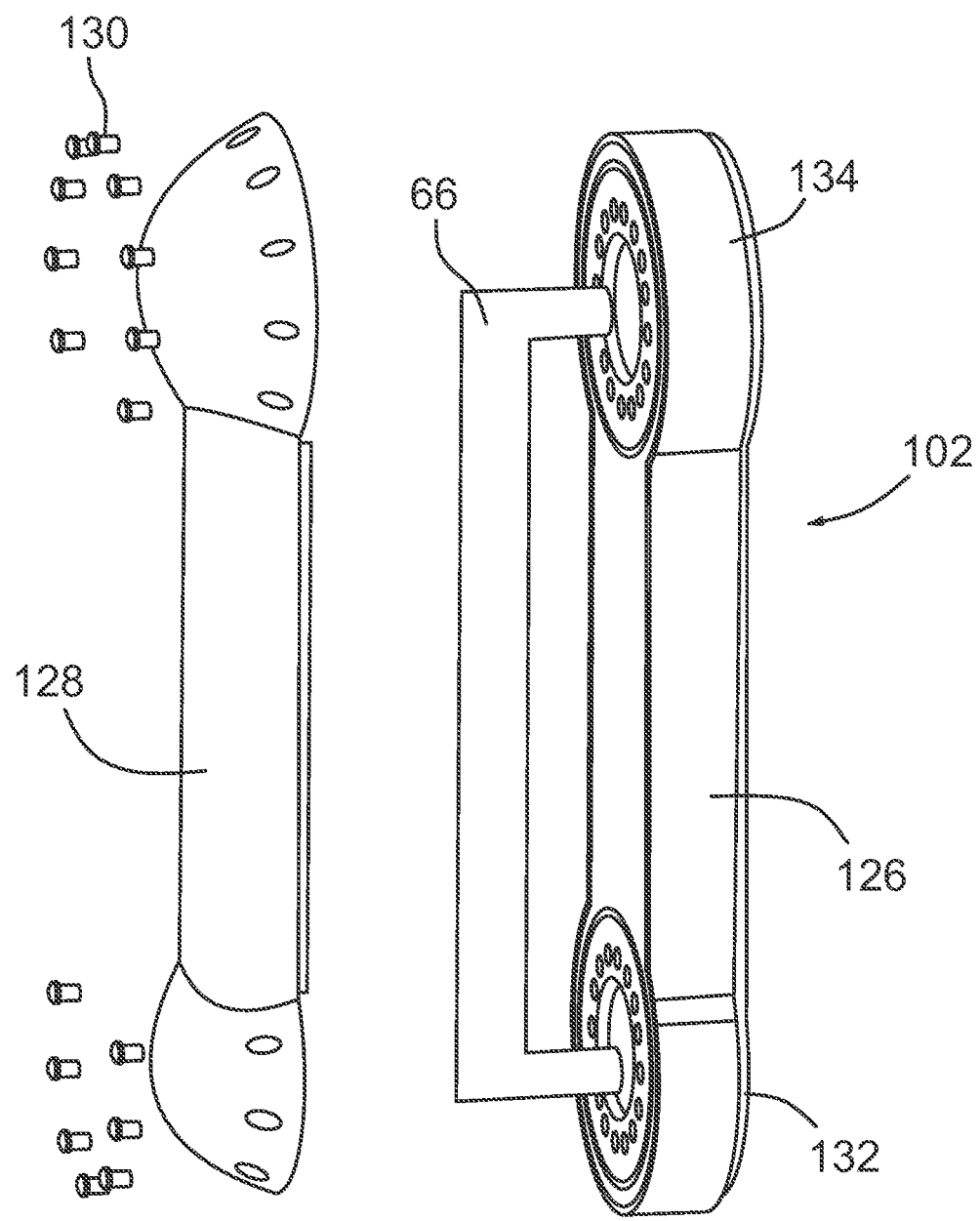
FIG. 14 is an exploded view of the shoulder link shown in the arm of FIGS. 12 and 13 as viewed from one side thereof.
Figure 15:
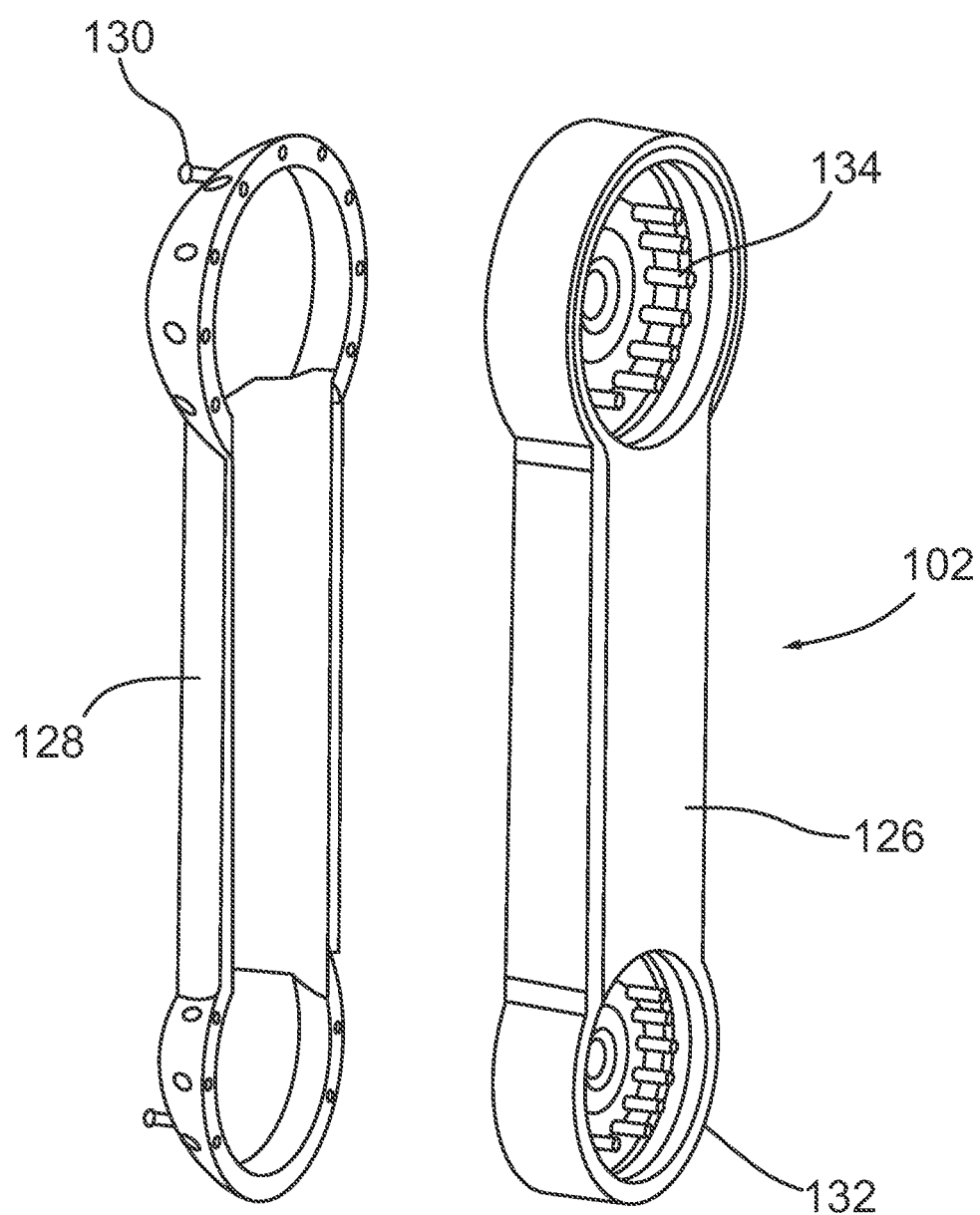
FIG. 15 is an exploded view of the shoulder link of FIG. 14 but viewed from the other side thereof.

Referring to FIGS. 14 and 15 the shoulder link 102 includes a link base 126 and a link cover 128 attached together with a plurality of screws 130. The shoulder link 102 provides a first port 132 and a second port 134 at opposed ends thereof which are attachable to the joints. The first port 132 and the second port 134 are generally in the same plane. The link base 126 is basically a plate and the link cover 128 is basically hollow cover. It will be appreciated by those skilled in the art that the design shown herein is both easy to use and easy to scale. It would be relatively inexpensive to change the length of the shoulder link 102. As can be seen the drawings the cable bundles 66 can easily pass through the shoulder link 102.

Referring to FIGS. 16-18, the elbow link 110 has a generally tubular hollow body 136 and a cover 138. Elbow link 110 includes a first port 140 and a second port 142. The first port 140 and second port 142 are generally orthogonal. The elbow link 110 can easily be elongated to increase the length of the link. As can be seen in the drawings since the link is hollow the cable bundles 66 can easily pass through the elbow link 110.

By using the combo actuators and placing motor drives 124 outside joint module, the 2-DOF joint module 10 is more compact and light weight.

Also, since the motor drives 124 are outside joint module 10, the influence of heat from the motor in the motor drive is external to the joint module and this allows the joint module to be designed in compact manner. These features enable the new joint modules to be used by robot arms working in industrial environments. This design overcomes the aforementioned heat dissipation problem in the prior art joints discussed above and specifically the Powerball ERB™ and U.S. Pat. No. 9,044,865B2.

It will be appreciated by those skilled in the art that to achieve larger power, torque and higher speed of the joints, the size of the joint module increases proportionally for the different purposes, such as accommodation of bigger components and heat dissipation. However, once the heat generation inside the joint module housing is reduced, within the original module space, each joint can be designed to achieve larger power, torque and higher speed. As shown in Table 1, each joint of L-shaped 2 DOF joint module 10 described herein is designed with larger motor power, torque and higher speed in comparison to SCHUNK's POWERBALL™ joint.

Figure 19:
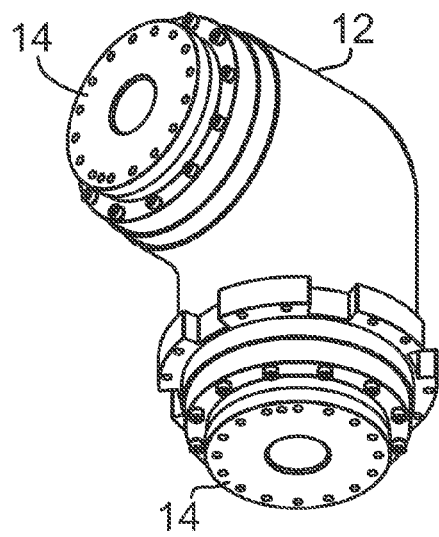
FIG. 19 is a perspective view of an alternate embodiment of the L-shaped two joint module shown in FIGS. 1 and 7 to 11 but with different sized hollow rotary actuator assemblies.
Figure 20:
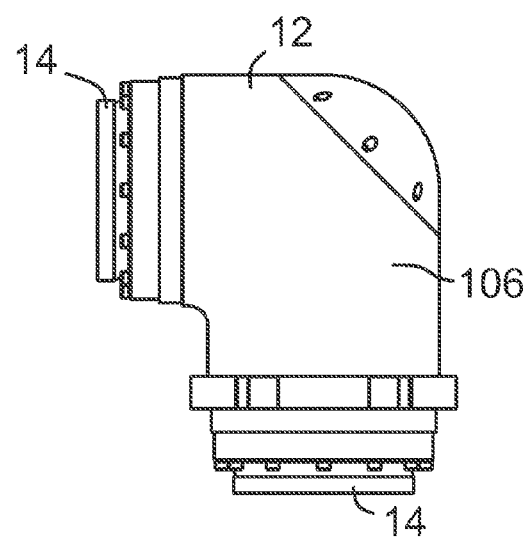
FIG. 20 is a side view of the L-shaped two joint module of FIG. 18.
Figure 21:
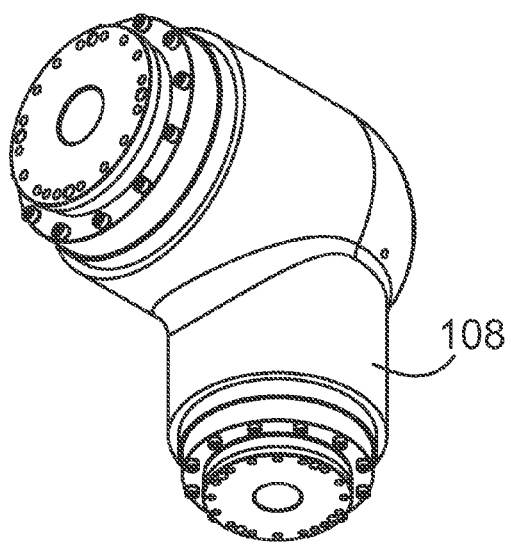
FIG. 21 is a perspective view of a further alternate embodiment of the L-shaped two joint module shown in FIGS. 1 and 7 to 11 and 18 and 19 but with different sized hollow rotary actuator assemblies, different from those shown in FIGS. 18 and 19.
Figure 22:
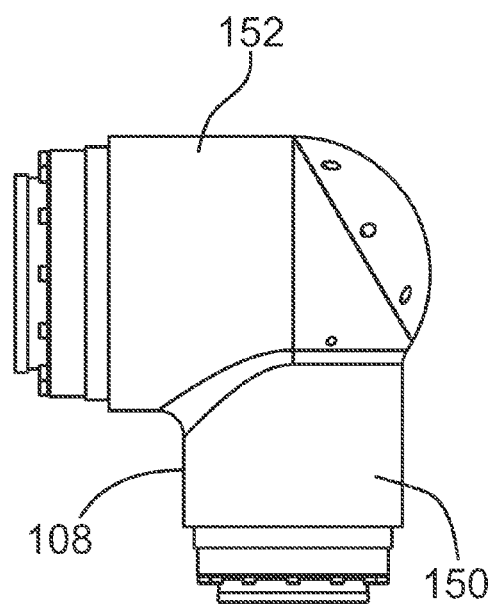
FIG. 22 is a side view of the L-shaped joint module of FIG. 21.

In addition the joint modules 10 may be sized for the particular purpose. As shown herein the turret-shoulder 104, elbow 106, and wrist 108 modules are sized for their particular purpose. For example the wrist module 108 has a smaller payload so the wrist module may be smaller. As well, the power, speed and torque of the hollow rotary actuator assemblies may be chosen for the specific purpose. The power, speed and torque characteristics may be different in one of the two degree of freedom joint module 10. As shown in Table 1 in the turret-shoulder module 104 the power, speed and torque of the hollow rotary actuator assemblies 14 for the turret joint and the shoulder joint are the same. In contrast in the elbow module 106 the power, speed and torque of the hollow rotary actuator assemblies 14 are different. As can be seen in FIGS. 19 and 20 the housing 12 of the elbow module 106 is the same as that shown in FIGS. 1 to 11 but the characteristics of the hollow rotary actuator assemblies 14 is different. In contrast in the wrist module 108 shown in FIGS. 21 and 22 the different arms of the L-shaped housing is different. Specifically one arm 150 is smaller than the arm 152 and the characteristics of the hollow rotary actuator assemblies 14 are different.

TABLE 1

Specification comparison between joint module 10 joints and SCHUNK's

| | Motor Power (W) | | Speed (deg/s) | | Torque (Nm) | |
|---|---|---|---|---|---|---|
| Joint | 104 | SCHUNK | 104 | SCHUNK | 104 | SCHUNK |
| Turret Joint | 480 | 72 | 70 | 72 | 382 | 35 |
| Shoulder Joint | 480 | 72 | 70 | 72 | 382 | 35 |
| Joint | 106 | SCHUNK | 106 | SCHUNK | 106 | SCHUNK |
| Elbow Pitch Joint | 308 | 72 | 180 | 72 | 178 | 35 |
| Elbow Roll Joint | 207 | 72 | 180 | 72 | 81 | 35 |
| Joint | 108 | SCHUNK | 108 | SCHUNK | 108 | SCHUNK |
| Wrist pitch Joint | 109 | 72 | 180 | 90 | 43 | 7 |
| Wrist twist Joint | 109 | 72 | 180 | 90 | 35 | 7 |

Figure 23:
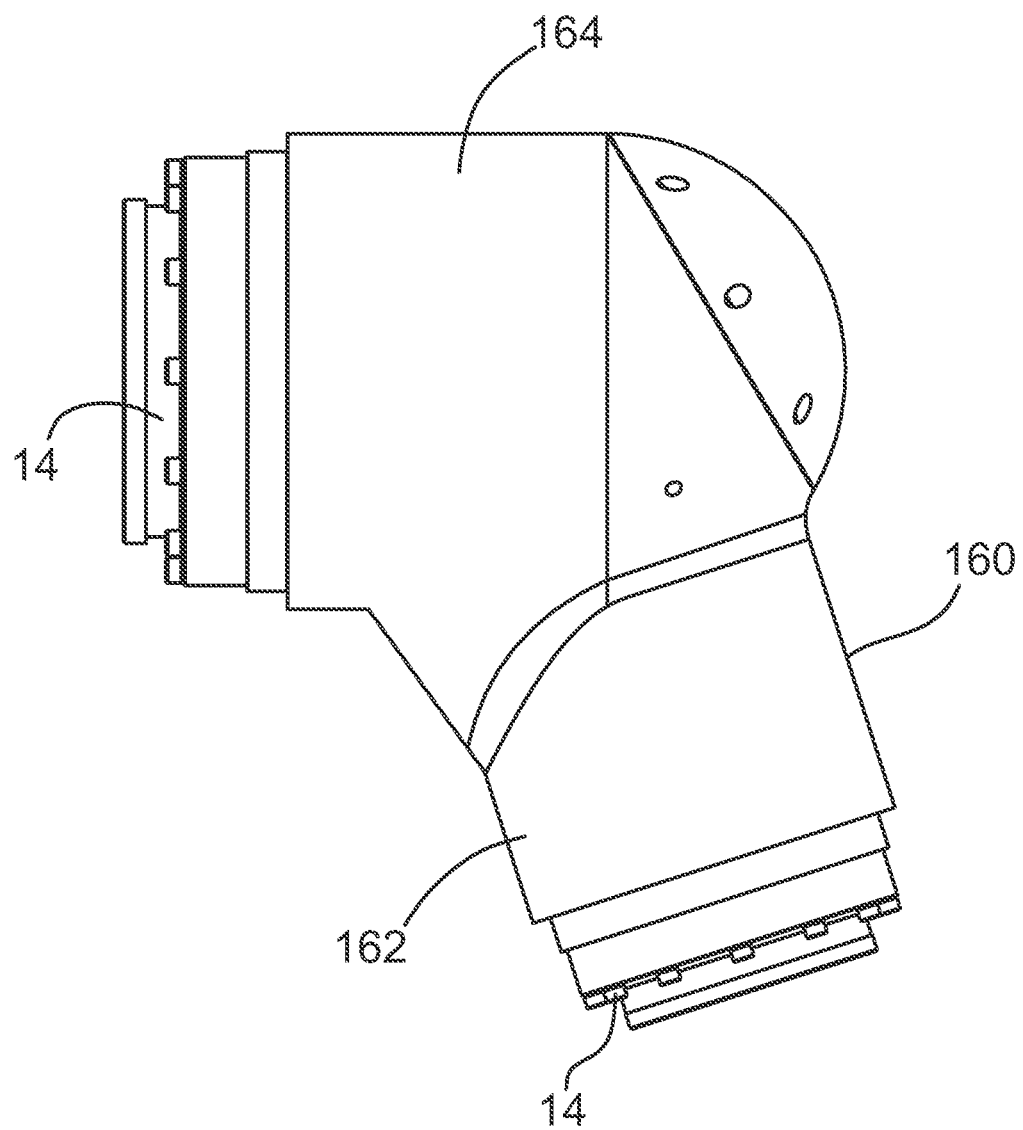
FIG. 23 is a perspective view of a further alternate embodiment of a two joint module similar to those shown in FIGS. 1 and 7 to 11 and 19 to 22 but with an obtuse angle between the two hollow rotary actuator assemblies.

The two degree of freedom joint module 10 may be varied by changing the angle between the two hollow rotary actuator assemblies 14 as shown in FIG. 23. The module 160 shown herein is similar to modules 10, 104, 106 and 108 but the angle between the assemblies 14 arms 162 and 164 is an obtuse angle. It will be appreciated by those skilled in the art that the angle shown herein is by way of example only and the user may choose whatever angle fits their particular purpose. The angle may be chosen if the joint is for use in a particularly awkward location where the convention right angle is not the optimal solution.

Figure 24:
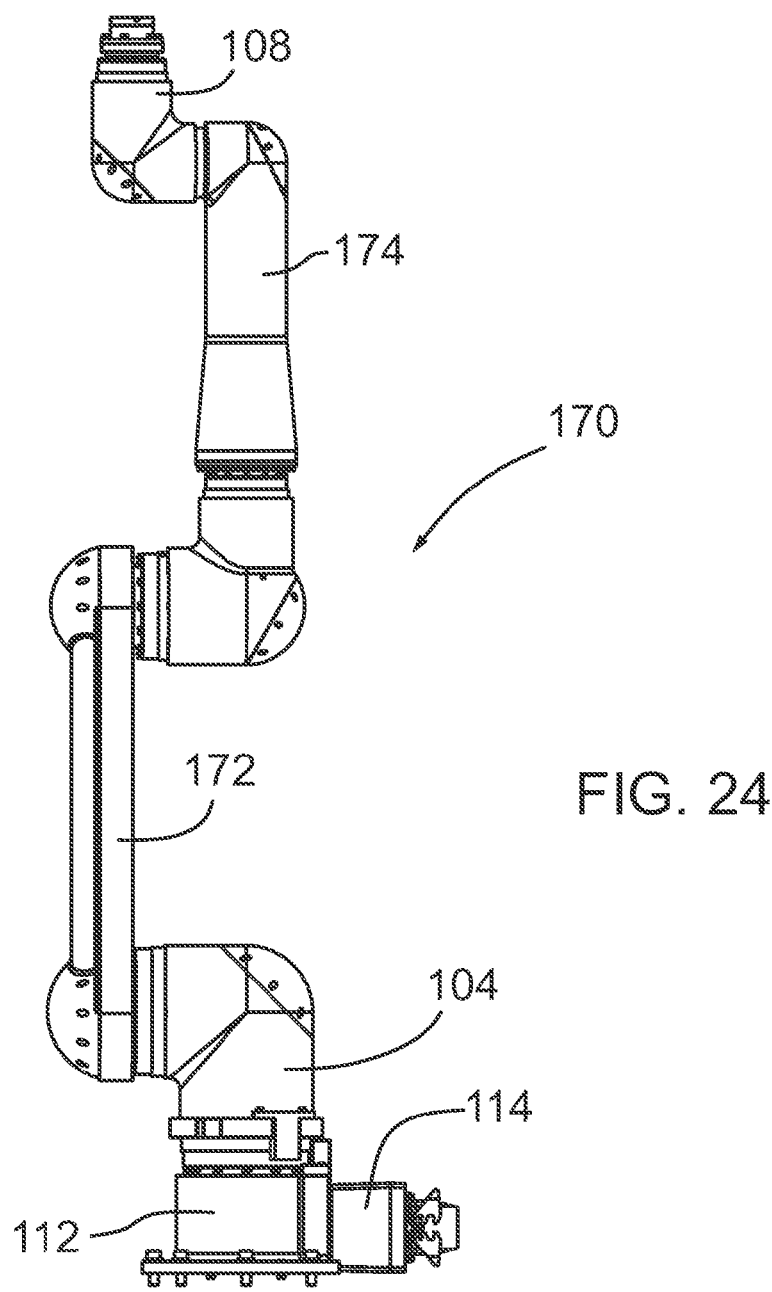
FIG. 24 is a side view of an alternate embodiment of an arm similar to that shown in FIG. 18 but having different sized links.

As discussed above the lengths of the links may vary depending on the needs of the user. An example of this is shown in FIG. 24 which shows an alternate arm 170. This arm is similar to that shown in FIG. 13 but with elongated shoulder link 172 and an elongated elbow link 174. In the example shown herein the sizes of the shoulder module 104, elbow module 106 and wrist module 108 are the same as those shown in FIG. 13 however as will be appreciated by those skilled in the art that the sizes of the joints may be varied depending on the needs of the user and the anticipated payload.

Figure 25:
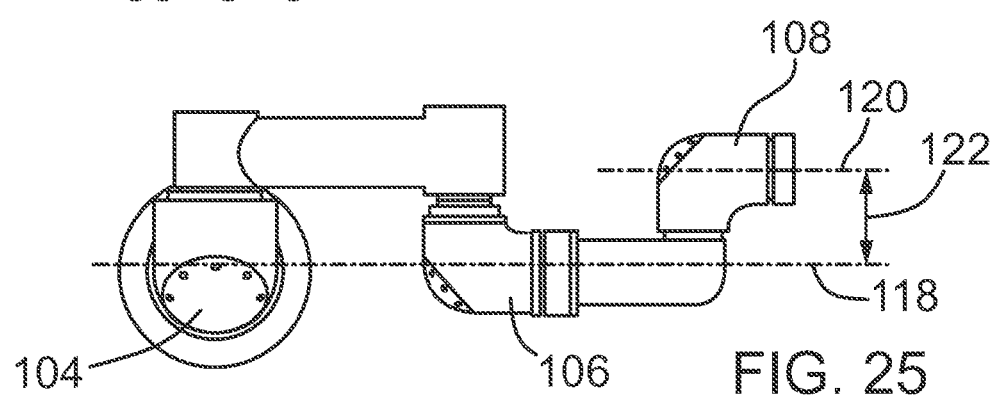
FIG. 25 is a top view of an arm using the L-shaped joints of FIGS. 1 and 7 to 11 and 19 to 22 but showing the offset.

In the configuration shown in FIG. 25, the axis 118 of the roll joint elbow module 106 is not aligned along the axis 120 of the twist joint of the wrist module 108. Axis 118 is offset 122 from axis 120 by a defined amount. This offset structure has not been seen in prior art robot arms even when these prior art robotic arms use a use a 2-DOF joint modules in their design.

The structure of the new joint module is of "L-Shape", which is not seen in the prior art. The "L-Shape" two joint module 10, consisting of two cylindrical tubes with their central axes orthogonal to each other is manufactured in one piece so its mechanical, structure is very sturdy. As discussed the size of the cylindrical tubes may be the same or vary depending on the combo actuators 14 sized to be used therein.

Due to the "L-Shape" structure of the module housing, the installation method of joints for each module is simpler than that of the prior art. The installation method is shown in FIG.

10. The two combo actuators 14 are inserted into the tubes of the "L-Shape" housing body 16 from outside to inside direction, with actuators' head/(shaft end or output shaft 48) facing outside and tail/(brake end 44) facing inside. The rotational axes of the two actuators are aligned with the tubes' axis 26, 28, which are orthogonal to each other and the tails of actuators are back-to-back to each other. Once the two actuators 14 are inserted into the tubes of the housing body 16, they are fixed to the housing with screws.

There are at least two advantages of this installation method. First, when installing the combo actuators 14 to the housing 12, the entire housing is not taken apart and the module remains in one piece. The firmness and stability of the structure, therefore, will remain. This feature overcomes the shortcoming of Fanuc design described above, whose actuators are installed from inside to outside and the entire joint is has to be taken apart for installation or maintenance. Second, since the two actuators 14 are back-to-back, the hollow shaft structure allows for simple cable routing and cable management. As shown in FIG. 11, cables go in from the head end of the first joint or combo actuator 14, and pass through the actuator 14 from the back end and then turn 90 degrees towards the second joint or combo actuator 14. Then, the cables go in from the back end of the second actuator 14, and go all the way out from the head end of the actuator 14.

Due to the structure of the module housing 12 and the simple installation method of joint module 10, the maintenance process of the joint and arm is relatively easy. As shown in FIG. 11, in the "L-Shape" housing, the two actuators are back-to-back to each other, so the electronic components of two actuators are all gathered and placed in the center corner compartment of the housing. Users can easily access the electronic components in the center compartment by taking the cover piece away without taking the entire joint module apart. Therefore, this design reduces the complexity of maintenance. As shown in FIG. 12, the 2 DOF joint modules 104, 106 and 108 can be used in a robotic arm 100. The joint modules 104, 106 and 108 represent the turret-shoulder, elbow-wrist, and wrist-pitch and wrist-roll modules respectively. The shoulder module 104 and the elbow module 106 are attached to opposing ends of the first or shoulder link 102 and the elbow module 106 and the wrist module 108 are attached to opposing ends of the second or elbow link 110. This design of the robotic arm has advantages.

Robotic arm 100 has a different structure from the robot arms the prior art robotic arms that use single joint modules or 2 DOF joint modules. Robotic arm 100 is configured such that the rotation axis of elbow-roll of the elbow joint 104 is not aligned or is offset with the rotation axis of wrist-twist of the wrist joint 108 as shown in FIG. 12. This configuration solves the singularity issue for wrist joint module, and thus expands the arm working space.

In addition the manufacturing and assembly processes of robotic arm 100 are greatly simplified. The arm uses same type of joint modules, the assembly between joint modules and links can be done in few steps. The number of components is lower than other robot arms using modular joints.

Generally speaking, the systems described herein are directed to 2-DOF joint modules and robotic arms that use same. Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein the "operably connected" or "operably attached" means that the two elements are connected or attached either directly or indirectly. Accordingly the items need not be directly connected or attached but may have other items connected or attached therebetween.

What is claimed is:

1. A two joint module for use with cables comprising:
a housing;
a pair of hollow rotary actuator assemblies each having an axis and a hollow shaft and the axes being arranged at an angle to each other and the pair of hollow rotary actuator assemblies being arranged such that a back end of each of the hollow rotary actuator assemblies is inside the housing and a front end of each of the hollow rotary actuator assemblies extends outwardly of the housing, and attached to the housing such that the cables can be fed from the outside of one of the pair of hollow rotary actuator assemblies to the inside thereof and to the inside of the other of the pair of hollow rotary actuator assemblies to the outside thereof; and
a pair of motor drives operably attached to the pair of hollow rotary actuator assemblies and the motor drives being outside the housing.

2. The two joint module of claim 1 wherein the axes of the pair of hollow rotary actuator assemblies are arranged orthogonally.

3. The two joint module of claim 2 wherein each hollow rotary actuator assembly includes a brushless DC servo motor having a hollow central portion, an encoder having a hollow central portion, a brake having a hollow central portion and an encoder having a hollow central portion.

4. The two joint module of claim 3 wherein each hollow rotary actuator assembly is a combo actuator.

5. The two joint module of claim 1 wherein housing includes a housing body and a housing cover releasably attachable to the housing body.

6. The two joint module of claim 5 wherein the housing body includes a pair of generally cylindrical compartments such that each hollow rotary actuator assembly is inserted into each cylindrical compartment from outside the housing.

7. The two joint module of claim 6 wherein the housing body further includes center compartment between the two generally cylindrical compartments.

8. The two joint module of claim 1 wherein the axes of the pair of hollow rotary actuator assemblies are arranged at an obtuse angle therebetween.

9. The two joint module of claim 1 wherein the power, speed and torque of the pair of the hollow rotary actuator assemblies is the same.

10. The two joint module of claim 1 wherein the power, speed and torque of the pair of the hollow rotary actuator assemblies is different.

* * * * *